(12) United States Patent
Kanzaki et al.

(10) Patent No.: US 6,882,340 B2
(45) Date of Patent: Apr. 19, 2005

(54) ELECTRONIC PEN

(75) Inventors: Hiromichi Kanzaki, Kazo (JP); Yashuyuki Fukuashima, Goka-Machi (JP)

(73) Assignee: Wacom Co., Ltd., Saitama (JP)

( * ) Notice: Subject to any disclaimer, the term of this patent is extended or adjusted under 35 U.S.C. 154(b) by 225 days.

(21) Appl. No.: 10/271,561

(22) Filed: Oct. 17, 2002

(65) Prior Publication Data

US 2003/0076310 A1 Apr. 24, 2003

(51) Int. Cl.⁷ .............................................. G09G 5/00
(52) U.S. Cl. .................. 345/179; 178/19.01; 178/19.04
(58) Field of Search .................. 345/179, 173, 345/194, 175, 176, 177, 178, 180, 181, 182, 183; 382/313, 314; 178/19.01, 19.04

(56) References Cited

U.S. PATENT DOCUMENTS

| | | | | | |
|---|---|---|---|---|---|
| 5,111,004 A | * | 5/1992 | Gullman | .................. | 178/19.04 |
| 5,419,563 A | * | 5/1995 | Abrams et al. | ............. | 473/202 |
| 5,447,167 A | * | 9/1995 | Fleischaker | ................ | 600/595 |
| 5,977,959 A | * | 11/1999 | Katsurahira et al. | ........ | 345/179 |
| 6,259,438 B1 | * | 7/2001 | Fleck et al. | .................. | 345/184 |
| 6,307,956 B1 | * | 10/2001 | Black | .......................... | 382/124 |
| 6,330,359 B1 | * | 12/2001 | Kawabata | .................... | 382/188 |
| 2001/0008389 A1 | * | 7/2001 | Serban et al. | ................. | 338/47 |
| 2003/0122804 A1 | * | 7/2003 | Yamazaki et al. | .......... | 345/179 |

* cited by examiner

*Primary Examiner*—Xiao Wu
(74) *Attorney, Agent, or Firm*—Liniak, Berenato & White, LLC

(57) ABSTRACT

An electronic pen is provided with a casing. A sensor substrate is formed by arranging two comblike conductive patterns on a flexible substrate so that the conductive patterns are interleaved but do not come into contact with each other. The sensor substrate is wound around part of the casing and is thereby fixed. A pressure-sensitive conductive rubber member is arranged to cover the sensor substrate. A protective grip is provided to cover these portions. Accordingly, a sensor which senses finger contact or a pressure applied by a finger is formed. When a finger presses the protective grip, a circuit on a control substrate detects a change in the relationship between the conductive patterns between which continuity is established by the pressure-sensitive conductive rubber member. The detection is transmitted as operation information to a digitizer by exchanging electromagnetic waves with the digitizer.

17 Claims, 2 Drawing Sheets

ELECTRONIC PEN

BACKGROUND OF THE INVENTION

1. Field of the Invention

The present invention relates to electronic pens (position indicators) which are provided for digitizer systems (coordinate input apparatuses) used as input devices for personal computers and the like.

2. Description of the Related Art

A digitizer system includes a digitizer (tablet) which is a substantially flat pad and which is placed on a personal-computer desk or integrated with a display of a portable personal computer (such as a personal digital assistant (PDA)) and an electronic pen which is held and supported by an operator's hand. While the electronic pen is operated on a position detecting area on the digitizer, the position of the electronic pen in the position detecting area is detected, and the detected position is continuously input as relative or absolute coordinate data to the personal computer or a processor.

A variety of additional input devices are used to input continuous coordinate data which correspond to operations by an operator to personal computers and the like. One input device commonly used is a mouse. Such continuous coordinate data is often used as coordinate data for a cursor on a display screen of a personal computer. Various information (signals) other than the coordinate data may be required to specify a position indicated by the cursor on the display screen or coordinate data which correspond to an image rendered by tracing the trajectory of the cursor.

In the above-described mouse, signals (finger-controlled operation information) generated by operating a switch positioned in the vicinity of the tip of a finger of a hand holding the mouse are output as the foregoing information (signals). Two or more switches may be employed so as to correspond to a plurality of fingers, and signals thus generated may be treated as different pieces of information.

In known electronic pens, different types of switches, which in this case are a switch (pen-down switch) which is turned ON when the entirety of a shaft-shaped casing is pressed against a digitizer and a switch (side switch) which is provided on a lateral side of the shaft-shaped casing and which is turned ON when it is pressed in a direction orthogonal to the axis, are employed to generate signals (finger-controlled operation information) which are detected by the digitizer. These signals are output as different pieces of information (signals).

Generally, a shaft-shaped casing for an electronic pen is formed such that a cross section of the casing is circular or substantially circular. When an operator holds the electronic pen, one cannot ensure that a finger (generally an index finger) operating the side switch is always at an appropriate position relative to the side switch. Actually the operator has to adjust his/her grip on the electronic pen in order to press the side switch properly. When the operator repeatedly alternates between the electronic pen and a different input device such as a keyboard, the operation efficiency is greatly reduced.

SUMMARY OF THE INVENTION

Accordingly, it is an object of the present invention to provide an electronic pen capable of generating finger-controlled operation information regardless of the direction in which a casing is held, whereby the necessity of readjusting the grip on the electronic pen is eliminated.

According to the present invention, the foregoing objects are achieved through provision of an electronic pen which includes a shaft-shaped casing and which is capable of transmitting, when being held in a hand and operated on a digitizer, at least position information concerning the electronic pen and finger-controlled-operation information to the digitizer. The electronic pen includes a sensor for sensing finger contact or a pressure applied by the finger, the sensor being provided on the entire periphery of at least part of the casing in the longitudinal direction; and a circuit for converting the finger contact or the pressure applied by the finger relative to the sensor into the operation information.

By using an electronic pen according to the present invention having the structure described above, finger contact or pressure by a finger can be applied to a sensor regardless of a direction in which a casing is held, whereby finger-controlled operation information can be generated. When holding the electronic pen, an operator is not required to be aware of the direction of the casing or to readjust his/her grip on the electronic pen, and the operation efficiency is thereby improved.

The sensor may include two contact terminals which are provided on a surface of the casing so as to cover the entire periphery of the casing; and a pressure-sensitive conductive rubber member which is provided to cover the two contact terminals.

The electronic pen may further include a spacer which is provided between the contact terminals and the pressure-sensitive conductive rubber member to break off contact between the contact terminals and the pressure-sensitive conductive rubber member in the initial state. Thus, generation of operation information as a result of bringing the contact terminals into contact with the pressure-sensitive conductive rubber member, that is, generation of operation information country to operator's intentions, is prevented.

The spacer may be formed of part of the casing. The electronic pen may further include a protective grip which covers the periphery of the pressure-sensitive conductive rubber member, thereby protecting and fixing the pressure-sensitive conductive rubber member.

In one embodiment, the invention comprises a digitizer stylus having a housing and a sensing region on the housing outer surface extending about the periphery over a portion of the length of the housing. The sensing region causes a signal to be generated when the sensing region is touched by a user and/or when pressure is applied thereto, and the signal is transmitted to a circuit. The stylus sensing region may include a sensor on the outer surface having first and second spaced conductors and a movable element for selectively connecting said conductors.

DESCRIPTION OF THE PREFERRED EMBODIMENTS

In the following description, embodiments of the present invention are applied to an electronic pen of a cordless digitizer for exchanging electromagnetic waves (see Japanese Unexamined Patent Application Publication No. 63-70326 by the assignee of the present invention). However, one of ordinary skill in the art will recognize that the invention may be achieved without these specific details.

Figure 1:
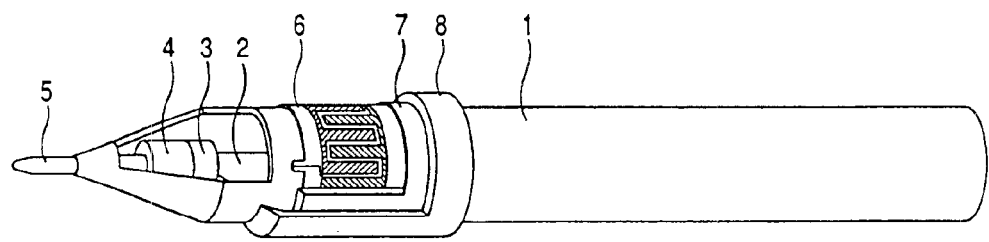
FIG. 1 is a broken view showing basic portions of a first embodiment of an electronic pen of the present invention.

FIG. 1 is a broken view of basic portions of a first embodiment of an electronic pen of the present invention. Referring to FIG. 1, the electronic pen includes a casing 1, a control substrate 2, a pen-down switch 3, a coil 4, a core 5, a sensor substrate 6, a pressure-sensitive conductive rubber member 7, and a protective grip 8.

The casing 1 is a circular cylinder having a tapered tip. The interior of the casing 1 accommodates the control substrate 2 which is electrically coupled thereto, the pen-down switch 3, and the coil 4. At the tip of the casing 1, the core 5 for applying a writing force to the pen-down switch 3 which in this case is a variable capacitor type is movably supported in the axial direction.

Figure 2A:
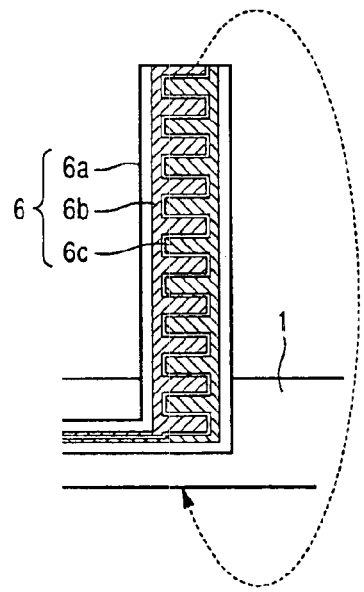
FIGS. 2A and 2B illustrate the details of a sensor substrate and how the sensor substrate is installed.

Referring to FIG. 2A, the sensor substrate 6 is formed such that two comblike conductive patterns (contact terminals) 6b and 6c are formed on a substantially belt-shaped flexible substrate 6a so that the conductive patterns 6b and 6c engage with each other but do not come into contact with each other. Toward the tip of the casing 1, the sensor substrate 6 is wounded around the entire periphery of the casing 1 and fixed. First ends of the conductive patterns 6b and 6c are led into the interior of the casing 1 and are connected to the control substrate 2.

Figure 2B:
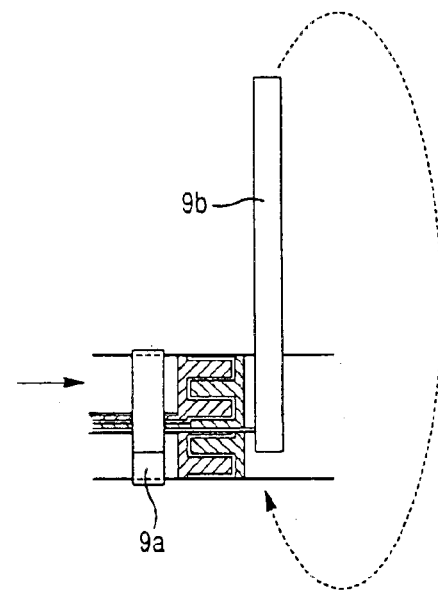

Referring to FIG. 2B, on both sides of a position at which the sensor substrate 6 is provided, spacers 9a and 9b which are thicker than the sensor substrate 6 are mounted in a manner similar to the sensor substrate 6. The pressure-sensitive conductive rubber member 7 is provided so as to cover the sensor substrate 6 through the spacers 9a and 9b. The protective grip 8 which is formed of, for example, general rubber is mounted so as to cover the overall components. Arranged as described above, a sensor for sensing finger contact or a pressure applied by a finger is formed.

Figure 3:
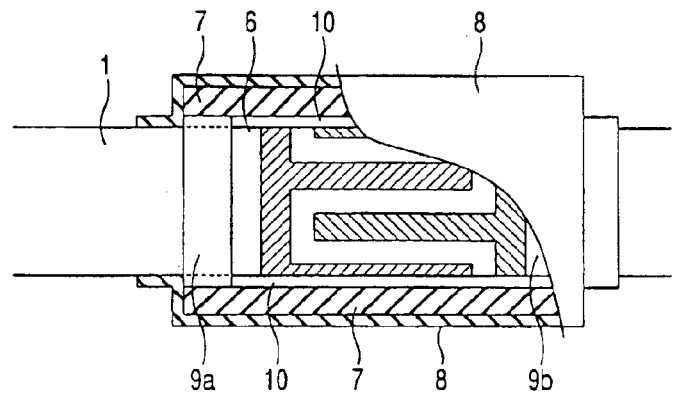
FIG. 3 is a broken view of a sensor portion.

FIG. 3 is a broken view of the sensor portion. Between the sensor substrate 6 and the pressure-sensitive conductive rubber member 7, a gap 10 is formed by the spacers 9a and 9b. Unless a finger comes into contact with the portion or a pressure is applied by a finger, the sensor substrate 6 and the pressure-sensitive conductive rubber member 7 do not come into contact with each other, and there is no electric continuity between the conductive patterns 6b and 6c.

The control substrate 2 is provided with a capacitor which forms a resonant capacitor in connection with the coil 4 and a circuit (writing force detection circuit) which is connected to the pen-down switch 3 and which detects a change in the capacitance as a result of pressing the pen-down switch 3 by the core 5. The control substrate 2 is also provided with a detection circuit (switch detection circuit) which is connected to the conductive patterns 6b and 6c and which detects a change in the continuity state between the pressure-sensitive conductive rubber member 7 and the conductive patterns 6b and 6c. The continuity state, which is more specifically a resistance, changes when the pressure-sensitive conductive rubber member 7 is brought into contact with the conductive patterns 6b and 6c. The control substrate 2 is also provided with a control circuit for transmitting the change in the capacitance (which is supplied as writing force information) and the change in the continuity state (which is supplied as a switch (ON) signal) to the digitizer. The control circuit controls characteristics of the resonant circuit in accordance with such information. Since the configuration of the detection circuits and the control circuit is well known to those skilled in the art (see, for example, Japanese Unexamined Patent Application Publication Nos. 3-189716, 3-89717, 7-182094, 7-200137, 7-219698, and 7-225644), descriptions of these circuits are omitted.

Figure 4:
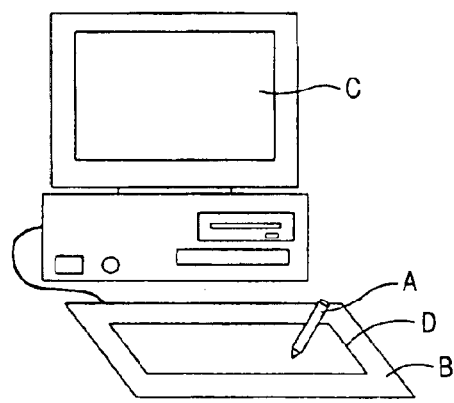
FIG. 4 illustrates an example of a digitizer system which includes the electronic pen of the present invention.

FIG. 4 illustrates the use of the digitizer system which includes the foregoing electronic pen. Referring to FIG. 4, the digitizer system includes the foregoing electronic pen A, digitizer B which corresponds to the electronic pen A, and personal computer (host computer) C which is connected to the digitizer B by way of a cable.

Arranged as described above, as a tip of the electronic pen A approaches the digitizer B, electromagnetic waves are exchanged between the electronic pen A and the digitizer B. In a position detecting area D of the digitizer B, the coordinate values of a position pointed by the electronic pen A are detected at the digitizer B side, and the coordinate values are then transmitted to the personal computer C.

When the core 5 of the electronic pen A is brought into contact with the position detecting area D and a writing force is thereby applied, as described above, the writing force is detected by the writing force detection circuit. The writing force information is transmitted to the digitizer B side by means of electromagnetic exchange between the electronic pen A and the digitizer B.

When the protective grip 8 of the electronic pen A is pressed by a finger or held against the position detecting area D by a hand, the pressure-sensitive conductive rubber member 7 comes into contact with the conductive patterns 6b and 6c, and hence continuity is established between the conductive patterns 6b and 6c. As described above, this is detected by the switch detection circuit, and the switch signal is transmitted to the digitizer B by means of electromagnetic exchange between the electronic pen A and the digitizer B.

Accordingly, the writing force information and the switch signal transmitted to the digitizer B side are transferred together with the coordinate values of the indicated position to the personal computer C.

Figure 5:
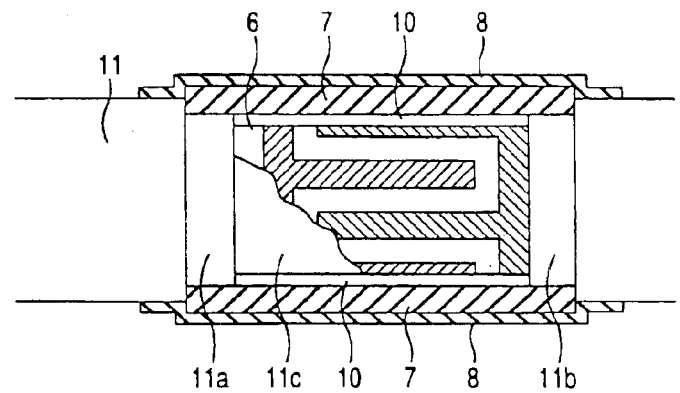
FIG. 5 is a broken view of a sensor portion of a second embodiment of an electronic pen of the present invention.

FIG. 5 shows a second embodiment of an electronic pen according to the present invention. In the second embodiment, instead of using spacers, a gap between a sensor substrate and a pressure-sensitive conductive rubber member is defined by the structure of a casing.

Specifically, FIG. 5 shows a casing 11. Toward one end, first steps 11a and 11b which each have a diameter smaller than the other portions and a second step 11c which has a diameter smaller than that of the first steps 11a and 11b are formed.

The width of the second step 11c is substantially the same as the width of the sensor substrate 6. The width of the entire step portion including the first steps 11a and 11b is substantially the same as the width of the pressure-sensitive conductive rubber member 7. The difference in diameter between each of the first steps 11a and 11b and the second step 11c is configured so as to form the above-described gap 10 between the sensor substrate 6 and the pressure-sensitive conductive rubber member 7, the sensor substrate 6 being wound around the second step 11c and the pressure-sensitive conductive rubber member 7 being mounted to cover the sensor substrate 6 through the first steps 11a and 11b.

According to the second embodiment, spacers which are additional components become unnecessary, and the components assembly is thereby simplified. The rest of the structure and advantages of the second embodiment are similar to those of the first embodiment.

In these embodiments, the protective grip 8 is provided for the purpose of fixing and protecting the pressure-sensitive conductive rubber member 7, but the protective grip 8 is not necessarily required. In these embodiments, the switching operation is advantageously detected by using patterns (such as the comblike patterns) of the sensor substrate 6 in which the areas of patterns opposed to each other become large. Alternatively, two parallel patterns can be simply used instead.

In these embodiments, a change in the resistance of the sensor for sensing finger contact or a force applied by a finger is processed as a switch (ON) signal. Since the resistance of the pressure-sensitive conductive rubber member 7 varies in proportion to the pressure, a change in the resistance can be processed as continuous pressure information. In these embodiments, the sensor for sensing finger contact or a pressure applied by a finger is provided on part of the casing. Alternatively, the sensor can be provided on the entire casing except for a tapered tip thereof.

What is claimed is:

1. An electronic pen operably associated with a digitizer for transmitting position information therebetween, comprising:

a longitudinally extending cylindrical casing;

a sensor for sensing pressure applied by a finger of a user, said sensor comprising two contact terminals disposed about the entire periphery of said casing and extending in the longitudinal direction;

a pressure-sensitive conductive member covering said two contact terminals; and a circuit for converting the sensed pressure applied by the finger relative to the sensor into operation information.

2. An electronic pen according to claim 1, further comprising a spacer provided between the contact terminals and the pressure-sensitive conductive member to hold the conductive member away from the contact terminals.

3. An electronic pen according to claim 2, wherein the spacer is formed of part of the casing.

4. An electronic pen according to claim 1, further comprising a protective grip which covers the periphery of the pressure-sensitive conductive member.

5. An electronic pen according to claims 2, further comprising a protective grip which covers the periphery of the pressure-sensitive conductive member.

6. An electronic pen according to claim 3, further comprising a protective grip which covers the periphery of the pressure-sensitive conductive member.

7. An electronic pen according to claim 1, wherein said pressure-sensitive conductive member is formed from rubber.

8. A digitizer stylus comprising:

a housing having a length, an outer surface and a periphery;

a sensing region on said housing outer surface extending about said periphery over a portion of said length, said sensing region causing a signal to be generated when pressure is applied to said sensing region, said sensing region including a sensor comprising two contact terminals disposed about the entire periphery of said housing;

a pressure-sensitive conductive member overlying the two contact terminals; and a circuit operatively coupled to said sensing region for receiving said signal.

9. A digitizer stylus according to claim 8 wherein said sensor comprises first and second spaced conductors and an element for selectively connecting said conductors.

10. A digitizer stylus according to claim 9 wherein said element is movable.

11. A digitizer stylus according to claim 8 wherein said sensor is located on said housing outer surface.

12. A digitizer stylus according to claim 10 including a spacer for holding said movable element away from said first and second spaced conductors.

13. A digitizer stylus according to claim 12 wherein the spacer comprises a portion of said housing.

14. A digitizer stylus comprising:

a housing having a length, an outer surface and a periphery;

a sensing region on said housing outer surface extending about said periphery over a portion of said length, said sensing region causing a signal to be generated when said sensing region is contacted by a user, said sensing region including two contact terminals disposed about the entire periphery of said housing and extending in the longitudinal direction;

a pressure-sensitive conductive rubber member covering said two contact terminals; and a circuit operatively coupled to said sensing region for receiving said signal.

15. A digitizer stylus according to claim 14 wherein said sensing region includes a sensor.

16. A digitizer stylus according to claim 15 wherein said sensor comprises first and second spaced conductors.

17. A digitizer stylus according to claim 14 wherein said sensor is located on said housing outer surface.

* * * * *